United States Patent [19]
Brown

[11] 3,767,860
[45] Oct. 23, 1973

[54] MODULATION IDENTIFICATION SYSTEM

[75] Inventor: Robert M. Brown, Woodbridge, Va.

[73] Assignee: Atlantic Research Corporation, Alexandria, Va.

[22] Filed: July 18, 1972

[21] Appl. No.: 272,953

[52] U.S. Cl. .............. 179/1 MN, 307/232, 328/109
[51] Int. Cl. ............................................ H04m 3/22
[58] Field of Search............ 179/1 MN, 1 VC, 1 VS, 179/2 DP, 15 AS, 15 BF, 175.2 C; 307/232, 236; 328/109, 110, 118, 120; 324/77

[56] References Cited

UNITED STATES PATENTS

| | | | |
|---|---|---|---|
| 3,524,935 | 8/1970 | Gonsewski et al. | 179/81 R |
| 3,448,215 | 6/1969 | Engel | 179/1 MN |
| 3,377,428 | 4/1968 | Dersch | 179/1 |
| 3,315,246 | 4/1967 | Huffman et al. | 307/232 |
| 2,974,281 | 3/1961 | Feldman | 324/77 |

*Primary Examiner*—William C. Cooper
*Assistant Examiner*—Randall P. Myers
*Attorney*—Marcus B. Finnegan et al.

[57] ABSTRACT

The embodiment of the modulation identification system which is disclosed provides a positive indication as to which of data or voice signals are present on the communication line being monitored or whether there is an absence of signals on that line. A pair of one-shots are included which are alternately triggered to their semi-stable states by the zero-crossings of the input signals. The duration of these semi-stable states can be adjusted so that their duration is slightly greater than the half-period of the lowest frequency signal which will be encountered. The output of both one-shots are applied to a NOR gate. The result is that for data signals, the output of the NOR gate is a logic 0 and for a no-signal condition the output is a logic 1. For voice signals, the output switches between 0 and 1, representing bursts of speech and the pause between speech. Three output channels one for each signal condition, individually process these logic signals in combination with clock pulses applied by a clock source to give a positive indication of the input signal conditions. The frequency of the clock is preferably selected so that there will be at least two seconds between clock signals. This period of time is generally long enough to encompass most uninterrupted bursts of speech and pauses so that the data and no-signal channels will not be falsely actuated when voice is present, yet brief enough to give a fairly rapid system response to a change in signal condition.

13 Claims, 1 Drawing Figure

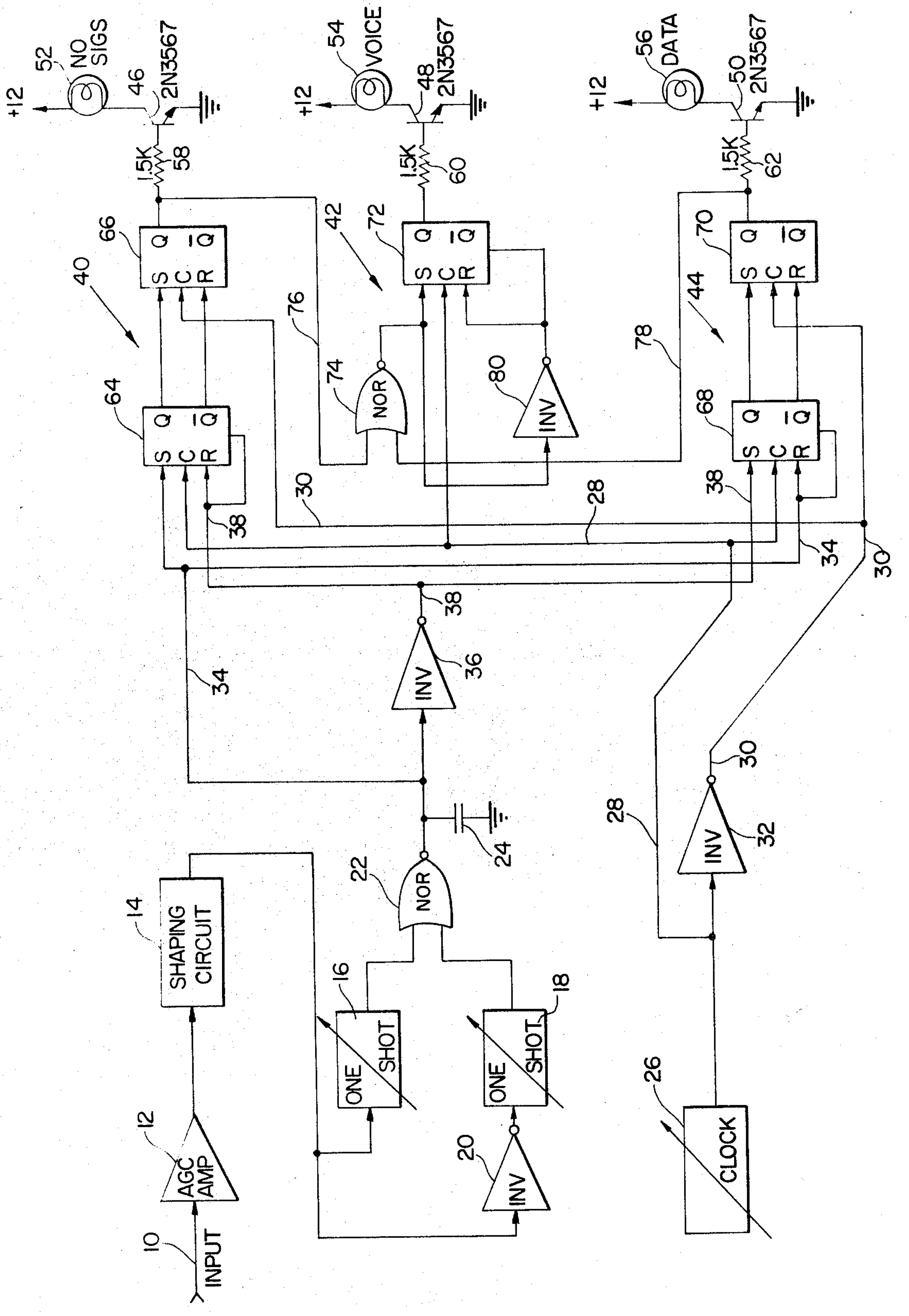
NO SIGS
VOICE
DATA
2N3567
+12
1.5K
NOR
INV
SHAPING CIRCUIT
AGC AMP
INPUT
ONE SHOT
CLOCK

MODULATION IDENTIFICATION SYSTEM

BACKGROUND OF THE INVENTION

The present invention relates to a modulation identification system for use with communication networks and systems. More particularly, it relates to a modulation identification system which discriminates or distinguishes between voice and data signals or the absence of signals.

It is often desirable to monitor a communication line to determine how and to what extent the line is being used. At audio frequencies, such as are used for the sending and receiving of telephone and data signals, the latter including telegraph signals within its scope, it is quite common to provide a customer with a line or circuit which is used for both voice and data communication needs. Because the charge or tariff is determined by the grade of circuit provided, and not necessarily the use to which such circuit is put, it results in an inefficient as well as an expensive practice to employ a data circuit when the transmissions are primarily voice. It is preferable therefore to be able to monitor the use to which a customer is putting his circuit and appropriately switch to a lower grade circuit if voice transmissions form most of his communications.

Similarly, in the routing of audio signals, it is often required that the transmission be monitored at a communication center or terminal location and directed to a voice user or a data terminal, depending on whether voice or data, respectively, is on the line. While an operator can listen and manually perform the required switching, it leads to greater efficiencies and substantially eliminates the likelihood of error if the operator can be automatically informed of the type of signals which are being carried over his communication circuits. If desired, automatic switching can also be performed. Additionally, the capability of being able to automatically monitor communications circuits lends itself readily to continuous monitoring and the ability to make a recording of the utilization of the circuit for future reference.

The patent to Engel No. 3,448,215 is directed to a monitoring device for distinguishing between voice and data signals. This patent alleges that it also provides an indication when no signals are present; however, in the description of the circuit shown in the patent, it seems that only indications of voice or data are provided even in the presence of a no-signal condition. Furthermore, the circuitry employed in the Engel patent to detect the presence of voice or data signals is primarily of the analog type incorporating integrators and amplitude-sensitive circuits such as Schmitt triggers.

SUMMARY OF THE INVENTION

The modulation identification system of the present invention distinguishes between voice and data signals in the communication line, or whether there is an absence of signals. The circuitry which discriminates between these three types of signal conditions is primarily of a digital type which permits the input signals to be rapidly and accurately processed with a reduced likelihood of error as compared to an analog circuit.

In accordance with the purposes of the invention, as embodied and broadly described herein, the system of this invention comprises means for receiving signals from a communication line and shaping them to provide a pulse train in which the edges of the pulses correspond to the zero-crossings of said signals; dual timing means for generating substantially constant-width pulses in response to the occurrence of the edges of said pulse train pulses; means responsive to said constant-width pulses for providing a signal having one or the other of two binary states as determined by the presence or absence of said constant-width pulses; a source of clock pulses; three output circuits, each of said output circuits being indivudually actuatable to provide an output indicative of the presence of one of said voice or data signals or absence of signals; and means responsive to both the binary states of said signal and the receipt of clock pulses from said source for individually actuating said output circuits.

Preferably, the dual means includes a pair of monostable circuits, such as one-shots, which are alternately triggered in response to the edges of the pulses in the pulse train to form the constant-width pulses. It is also preferred that the dual means be adjustable to accommodate a wide range of input signal frequencies and that the constant-width pulse be greater than the half-period of the lowest input frequency which can occur.

It is also preferred that the actuating means include three channels, two of said channels being directly responsive to the binary states of said signal of said providing means and the receipt of clock pulses to indicate the presence of data or the absence of signals, and the third channel being responsive to the output of said two channels and the receipt of at least one clock pulse to indicate the presence of voice signals.

The invention consists in the novel circuits, constructions, arrangements, combinations, and improvements shown and described. The accompanying drawing, which is incorporated in and constitutes a part of the specification, illustrates one embodiment of the invention and, together with the description, serves to explain the principles of the invention.

BRIEF DESCRIPTION OF THE DRAWING

The sole FIGURE of the drawing illustrates the preferred embodiment of the inventive system depicted in block diagram and logic form.

DESCRIPTION OF THE PREFERRED EMBODIMENT

Reference will now be made in detail to the present preferred embodiment of the invention, an example of which is illustrated in the accompanying drawing.

Referring now to the drawing, it should be understood that the modulation identification system of the present invention can be connected into a communication line by an input line 10 so that voice or data signals or the absence of signals therein can be monitored.

In accordance with the invention, means are provided for receiving these signals and shaping them to provide a pulse train in which the edges of the pulses correspond to the zero-crossings of said signals. As here embodied, the input line 10 is connected to amplifier 12 whose output is in turn connected to a shaping circuit 14. The amplifier 12 preferably incorporates an automatic gain control circuit so that the system can accommodate input signals of a widely varying level. The shaping circuit 14 is preferably a squaring circuit which takes the output of amplifier 12 and generates a pulse train whose transitions or excursions form sharp edges which correspond to the zero-crossings of the voice or data signals.

In accordance with the invention, dual timing means are provided for generating substantially constant-width pulses in response to the occurrence of the edges of the pulse train pulses. As here embodied, the dual means includes a pair of monostable multivibrators 16 and 18, depicted here as one-shots, which are connected to the output of shaping circuit 14. Preferably, the one-shots 16 and 18 are of identical construction and are adjustable to accommodate many bands of input frequencies by varying the duration of their semi-stable state and thus the duration of the constant-width pulses. An inverter 20 is interposed between shaping circuit 14 and one-shot 18 so that the two one-shots will be alternately actuated by the sharp edges or excursions of the pulse train applied by shaping circuit 14. As an example, one-shot 16 can be actuated by pulse edges corresponding to positive-going excursions of the pulse train, and one-shot 18 can be actuated by edges corresponding to negative-going excursions of the pulse train (which become positive-going excursions after being inverted).

More specifically, each of the one-shots 16 and 18 is designed to be alternately actuated at the beginning of a half cycle of the signal applied at input 10, and the purpose of the shaping circuit 14 is to ensure that these one-shots 16 and 18 are triggered at the zero-crossings of these signals which, of course, correspond to the start of a half cycle. If desired, the transitions can be differentiated, and the resulting voltage spikes used to trigger the one-shots. The one-shots are preferably constructed with precision components so that the duration of the semi-stable states are consistently substantially the same length.

In accordance with the invention, there are also means responsive to the constant-width pulses for providing a signal having one or the other of two binary states as determined by the presence or absence of the constant-width pulses. As here embodied, a coincidence gate 22 has its two inputs connected to the outputs of one-shots 16 and 18. Preferably, coincidence gate 22 functions as a NOR gate so that upon application of two logic 0's at its input, its output will be a logic 0. For any other combination of logic 1's and 0's at its input, its output will be a logic 0. When either of the one-shots 16 and 18 is triggered to its semi-stable state, the constant-width output pulse applied to NOR gate 22 shall herein be considered to be a logic 1. When the one-shot is in its stable state, its output shall be considered to be a logic 0.

The output of NOR gate 22 is applied to line 34 and to inverter 36 whose output is in turn connected to line 38. The level of line 34 thus follows the output of NOR gate 22 while the inverse signal appears on line 38. A small capacitor 24 is connected at the output of NOR gate 22 to pass switching transients to ground.

In accordance with the invention, a source of clock pulses is provided and, as here embodied, is represented by clock 26. Clock 26 preferably generates a squarewave and runs low frequency rate which, for example, can be .25 Hz. The period of the clock is thus 4 seconds, and there will always be at least 2 seconds before successive positive and negative excursions occur in the squarewave. This is generally a sufficient duration to encompass the normal pause in a voice conversation, yet brief enough to give a fairly rapid system response to a change in signal condition. The positive excursions of the squarewave appear as logic 1's on line 28 and the negative excursions appear as logic 1's on line 30 after inversion at inverter 32. Preferably, the clock is variable in frequency so that other frequencies and time durations can be selected, if desired.

In accordance with the invention, there are provided three output circuits, each of the output circuits being individually actuatable to provide an output indicative of the presence of one of said voice or data signals or absence of signals. As disclosed herein, the output circuits are connected at the end of each of three channels, indicated generally by arrows 40, 42, and 44, so that dependent upon the type of signal, or absence of signal, presented at the input line 10, one and only one of the output circuits will be actuated. The signal which is derived at each output circuit can be used to provide either control or indication functions, by way of example. Preferably, each output circuit includes a transistor 46, 48, and 50 which is used to drive an output lamp. As shown herein, the lamps are identified by numerals 52, 54, and 56 connected respectively to the collectors of transistors 46, 48, and 50. Input resistors 58, 60, and 62 are connected respectively to the same transistors.

In accordance with the invention, there are means provided which are responsive to both the binary state of the signal from the providing means and the receipt of clock pulses from the clock source for individually actuating the output circuits. As embodied herein, these actuating means are incorporated into each of the channels 40, 42, and 44.

Preferably, channels 40 and 44 both include a pair of JK flip-flops connected in tandem to function as a shift register. As may be seen from the figure, channel 40 includes flip-flop 64 whose SET input is connected to line 34 and whose RESET input is connected to line 36. The clock input of flip-flop 64 is connected to line 28. The Q output of flip-flop 64 is connected to the SET input of flip-flop 66. The RESET input of flip-flop 66 is connected to the Q output of flip-flop 68 and the clock input is connected to line 30. The Q output of flip-flop 66 is connected to the base of transistor 46 via resistor 58.

Channel 44 is of similar construction; however, the SET side of the input flip-flop 68 is connected to line 36 while the RESET input is connected to line 34. The clock input is connected to line 28. The Q output of flip-flop 68 is connected to the SET input of flip-flop 70 and the Q output of flip-flop 68 is connected to the RESET input of flip-flop 70. The clock input of flip-flop 70 is connected to line 30. The Q input of flip-flop 70 is connected to the base of transistor 50 via resistor 62.

Channel 42 differs in construction from channels 40 and 44 and preferably contains a single flip-flop 72 whose clock input is connected to line 28. The SET input of flip-flop 72 is connected to the output of a NOR gate 74. The two inputs to NOR gate 74 are connected by lines 76 and 78, respectively, from the Q output of flip-flop 66 in channel 40 and the Q output of flip-flop 70 in channel 40. The output of NOR gate 74 is also connected to the input of inverter 80 whose output is in turn connected to the RESET input of flip-flop 72. The Q output of flip-flop 72 is connected to the base of transistor 48 by way of resistor 60.

In view of the foregoing description of construction of the system of this invention, it becomes clear that the system as described presents a digital approach for discriminating between voice and data and no-signal conditions on a communication line. Generally, the range or band of frequencies which can appear at the input line 10 is known, an example being the range of 300–4000 Hz. Before the system is operated, the one-shots 16 and 18 are both adjusted so that the semi-stable states which provide the constant-width pulses are set to have a duration slightly greater than one-half of the period of the lowest frequency, e.g., 300 Hz, which can appear at the input 10.

Assume for the purpose of the description of operation of the invention that a telephone line is being monitored at input line 10. In such case, all of the signals will be tones. Any data signals which are received will be periodic AC signals and after amplification in amplifier 12 and squaring in shaping circuit 14 will appear as a squarewave with equal spacing between adjacent edges or excursions of the waves. When voice is applied at the input, the signals arrive in bursts. When the signals are present, they are received by amplifier 12 and then shaped in squaring circuit 14. The outputs of this latter circuit are pulse trains corresponding to the signal bursts separated by spaces in which no pulses occur. The pulses in the pulse train bursts are generally aperiodic where the width between excursions vary because they follow the zero-crossings of the aperiodic voice signals. In the absence of voice or data signals at the input, no pulses are provided at the output of shaping circuit 14.

As explained previously, one-shot 16 is triggered by positive excursions or edges in the pulse train, while the other one-shot 18 is triggered by negative-going edges of the pulse train after inversion by inverter 20 to a positive-going signal. Assuming that data is being received at input 10, that one-shot 16 is triggered by a positive-going edge or excursion of the pulse train to create a constant-width pulse which is applied to NOR gate 22. Before one-shot 16 times out, the subsequent negative edge appears out of circuit 14 and triggers one-shot 18 so that a constant-width pulse is also produced there. One shot 16 now times out, but before one-shot 18 can also time out, the next positive edge of the pulse train arrives to trigger one-shot 16 back to its semi-stable state and a new constant-width pulse is again produced. Thus, with data on the line, it can be seen that one of the one-shots 16 and 18 will always be in a semi-stable state so that a logic 1 is always applied to at least one of the inputs of NOR gate 22. This is because the timing of the semi-stable states of these one-shots is set to be slightly greater than the half-period of the lowest input frequency, and neither one-shot can time out before the other one-shot is triggered by a subsequent transition. Because a logic 1 signal will always be present at at least one of the inputs of NOR gate 22, the output of NOR gate 22 is always a logic 0 when data is applied at the input.

When no signal is being applied at input 10, the output of shaping circuit 14 remains at a constant level so that there are no transitions to actuate one-shots 16 and 18. As a result, both one-shots remain in their stable states and provide logic 0's to the input of NOR gate 22. Accordingly, under a no-signal condition at the input 10, the output of NOR gate 22 is a logic 1.

During the presence of voice signals at input 10, the output of NOR gate 22 is a logic 0 when the signal bursts are present because the pulse transitions in the pulse train provided by shaping circuit 14 keep at least one of the one-shots 16 and 18 in its semi-stable state so that a logic 1 is applied to NOR gate 22. Between signal bursts, the output of NOR gate 22 becomes a logic 1 because both one-shots time out and provide logic 0's to the inputs of this NOR gate.

For purposes of convenience, channel 40 has been designated the "NO-SIGNAL" channel, channel 42 has been designated the "VOICE" channel, and channel 44 the "DATA" channel.

Assuming that a no-signal condition is present at the input 10, the logic 1 output of NOR gate 22 is applied on line 34 to set the flip-flop 64 in channel 40. At clock 26, the next positive excursion of its output squarewave is applied over line 28 to the clock input of flip-flop 64 to cause its Q output to rise to the logic 1 state. This logic 1 is thus shifted or applied to the SET input of flip-flop 66. The subsequent negative excursion, which at the selected clock frequency of .25 Hz arrives in 2 seconds, is inverted at inverter 32 and applied by line 30 to the clock input of flip-flop 66. The Q output of this flip-flop rises to a logic 1 and transfers this signal to the base of transistor 46 to actuate this transistor and illuminate lamp 52. In this manner an indication of a no-signal condition is made.

Should the no-signal condition terminate prior to the actuation of transistor 46, one of the one-shots 16 and 18 is actuated to cause the output of NOR gate 22 to become a logic 0. This is inverted at inverter 36 to a logic 1 and applied by line 36 to the RESET input of flip-flop 64. This RESET is self-clocking and the Q output of flip-flop 64 becomes a logic 1 and the Q output becomes a logic 0. Thus, flip-flop 66 cannot be set by the subsequent clock pulse applied by line 30 to the clock input of flip-flop 66. In a similar manner, channel 40 is reset when the no-signal condition ends. Flip-flop 64 becomes reset as described above, and then the next clock pulse on line 30 resets flip-flop 64 because a logic 1 is now being applied to its RESET input. Transistor 46 turns off and lamp 52 becomes dark.

The DATA channel 44 operates in much the same way as the NO-SIGNAL channel 40, except that the inverter 36 changes the logic 0, which appears at the output of NOR gate 22 when DATA is present, to a logic 1 which is applied to the SET input of flip-flop 68. If the DATA signals persist for both a positive and negative excursion out of clock 26, the logic 1 signal will be transferred from flip-flop 68 to flip-flop 70 by the clock excursion applied on line 28 and then to output transistor 50 by the clock excursion applied on line 30. Transistor 50 turns on and lamp 56 becomes illuminated to indicate the present of DATA signals in the circuit being monitored.

Should the DATA signals end prior to the actuation of transistor 50, channel 44 operates in the same manner as channel 40 except that the self-clocking reset of flip-flop 68 is actuated by logic 1 on line 34. Similarly, the reset of channel 40 is initiated by a logic 1 signal resetting flip-flop 68 followed by a clock pulse on line 30 resetting flip-flop 70 to turn off transistor 50.

When VOICE signals are applied to input 10, the output of NOR gate 22, as previously explained, is at logic 0 when a burst of VOICE is present and at logic 1 in the pause between bursts. It has been assumed that uninterrupted speech or an uninterrupted pause will not persist for more than 2 seconds. Thus, neither logic signal persists long enough without interruption to permit clock 26 to generate both a positive and a negative excursion at the selected frequency (e.g., .25 Hz). Neither channel 40 nor channel 44 can function to turn on its output transistor 46 or 50. The Q outputs of both flip-flops 66 and 70 become a logic 0. NOR gate 74 in channel 42 receives these signals via lines 76 and 78 and provides a logic 1output to the SET input of flip-flop 72. When the next positive-going excursion from clock 26 arrives on line 28, flip-flop 72 becomes set and transfers or applies a logic 1 from its Q output to transistor 48. This transistor turns on, and lamp 54 becomes illuminated to indicate the presence of VOICE signals on the line being monitored.

When the VOICE signals end, either a DATA signal or NO-SIGNAL condition will occur. After a brief interval, either the Q output of flip-flop 66 or flip-flop 70 will become a logic 1 according to the operation described previously. Within the VOICE channel 42, the output of NOR gate 74 now assumes a logic 0 condition which will be inverted by inverter 80 to reset flip-flop 72 in view of its self-clocking connection. Transistor 48 turns off, and lamp 54 goes dark.

As has been described, the system of the present invention readily distinguishes between voice or data signals in a communication line, or the absence of signals therein, and gives a positive indication of the type of signal or a no-signal condition.

It will now become apparent to those skilled in the art that various modifications and variations can be made in the inventive system described herein without departing from the scope or spirit of the invention.

What is claimed is:

1. A system for distinguishing between voice and data signals in a communication line or the absence of signals therein, comprising:

a. means for receiving said signals and shaping them to provide a pulse train in which the edges of the pulses correspond to the zero-crossings of said signals,
b. dual timing means for generating substantially constant-width pulses in response to the occurrence of the edges of said pulse train pulses,
c. means responsive to said constant-width pulses for providing a signal having one or the other of two binary states as determined by the presence or absence of said constant-width pulses,
d. a source of clock pulses,
e. three output circuits, each of said output circuits being individually actuatable to provide an output indicative of the presence of one of said voice or data signals or absence of signals,
f. means responsive both to the binary states of said signal and the receipt of clock pulses from said source for individually actuating said output circuits.

2. A system as claimed in claim 1 wherein said dual timing means are selected to have the duration of said constant-width pulses greater than the duration of the half-period of the lowest frequency of the signals received by said system.

3. A system as claimed in claim 2 wherein said dual timing means are adjustable to permit the width of said constant-width pulses to be varied.

4. A system as claimed in claim 1 wherein said dual timing means include a pair of monostable multivibrators which are alternately triggered to their semi-stable states in response to the occurrence of the edges of said pulse train pulses so that constant-width pulses are alternately derived from said multivibrators.

5. A system as claimed in claim 4 wherein said providing means includes a gate connected to the outputs of said monostable multivibrators.

6. A system as claimed in claim 5 wherein said gate functions as a NOR gate to provide an output signal having one binary state in the absence of both constant-width pulses and the other binary state in the presence of at least one constant-width pulse.

7. A system as claimed in claim 6 wherein the duration of said constant-width pulses is greater than the duration of the half-period at the lowest frequency of the signals received by said system.

8. A system as claimed in claim 2 wherein said actuating means comprises three channels, two of said channels being directly responsive to the binary states of said signal of said providing means and to the receipt of said clock pulses to actuate the output circuits indicative of the presence of data signals and the absence of signals, and the third channel being responsive to the output of said two channels and the receipt of at least one clock pulse to actuate the output circuit indicative of the presence of voice signals

9. A system as claimed in claim 8 wherein said two channels both include a pair of flip-flops connected in tandem, the first flip-flop in both channels being connected to be directly responsive to the binary states of said signal of said providing means, and said third channel being connected to be responsive to the output of the second flip-flop in both channels.

10. A system as claimed in claim 9 wherein said dual timing means include a pair of adjustable one-shots, and said providing means includes a NOR gate connected to the output of said one-shots.

11. A system as claimed in claim 10 wherein said source of clock pulses is a clock for providing a square-wave output having a period of approximately 4 seconds.

12. A system as claimed in claim 2 wherein said source of clock pulses is a clock for providing a square-wave output having a period of approximately 4 seconds.

13. A system as claimed in claim 7 wherein said source of clock pulses is a clock for providing a square-wave output having a period of approximately 4 seconds.

* * * * *